United States Patent [19]

Taub et al.

[11] Patent Number: 4,768,087
[45] Date of Patent: Aug. 30, 1988

[54] EDUCATION UTILITY

[75] Inventors: Jack R. Taub, Vienna, Va.; Michael T. Hills, Silver Spring, Md.

[73] Assignee: National Information Utilities Corporation, Vienna, Va.

[21] Appl. No.: 748,037

[22] PCT Filed: Oct. 7, 1983

[86] PCT No.: PCT/US83/01579

§ 371 Date: Jun. 6, 1985

§ 102(e) Date: Jun. 6, 1985

[87] PCT Pub. No.: WO85/01854

PCT Pub. Date: Apr. 25, 1985

[51] Int. Cl.$^4$ .............................................. H04N 17/06
[52] U.S. Cl. .......................................... 358/84; 455/2; 434/307
[58] Field of Search .................... 358/84, 86; 434/323, 434/351, 118, 201, 202, 307; 455/2, 3, 5; 364/200 MS File, 900 MS File

[56] References Cited

U.S. PATENT DOCUMENTS

| | | | |
|---|---|---|---|
| 3,729,581 | 4/1973 | Anderson | 434/307 X |
| 3,993,861 | 11/1976 | Baer | |
| 4,323,921 | 4/1982 | Gillou | 358/86 X |
| 4,352,011 | 9/1982 | Guillou | |
| 4,388,645 | 6/1983 | Cox et al. | 358/86 X |
| 4,417,349 | 11/1983 | Hills et al. | |
| 4,506,387 | 3/1985 | Walter | 358/86 |
| 4,538,993 | 9/1985 | Krumholz | 434/118 |
| 4,625,235 | 11/1986 | Watson | 358/86 |
| 4,636,174 | 1/1987 | Andersen et al. | 434/323 X |

FOREIGN PATENT DOCUMENTS 49184  4/1982  European Pat. Off. ............ 434/323

OTHER PUBLICATIONS

McClannan et al, "A Satellite System for CATV," *Proceedings of the IEEE*, vol. 58, No. 7, Jul. 1970, pp. 987-1001.

J. Hedger, "Telesoftware: Home Computing Via Broadcast Teletext," *IEEE Transactions on Consumer Electronics*, vol. CE-25, No. 3, Jul. 1979, pp. 279-287.

Hurly et al, "The Videotex and Teletext Handbook," ©1985, Harper and Row, Publishers, Inc., NY, p. 115; TK 5105.H87.

Richard C. Hallgren, "A Multiple-Machine Loader for Classroom Computers," *Byte*, Oct. 1980, pp. 90, 92, 94.

*Primary Examiner*—Keith E. George
*Attorney, Agent, or Firm*—Kenyon & Kenyon

[57] ABSTRACT

A system for distributing educational information in digital form to a plurality of schools simultaneously transmits the information via a satellite (15) to FM stations (18) which retransmit to schools having receivers for receiving the information and a main computer (101) for storing the information. Access to the information is subsequently provided to a plurality of students via classroom computers (111) and individual terminals (121). Usage and performance data is automatically stored in the main computer (101) and sent to the sender by dial-up modem (105) to keep track of usage and to permit billing usage and royalty charges.

39 Claims, 3 Drawing Sheets

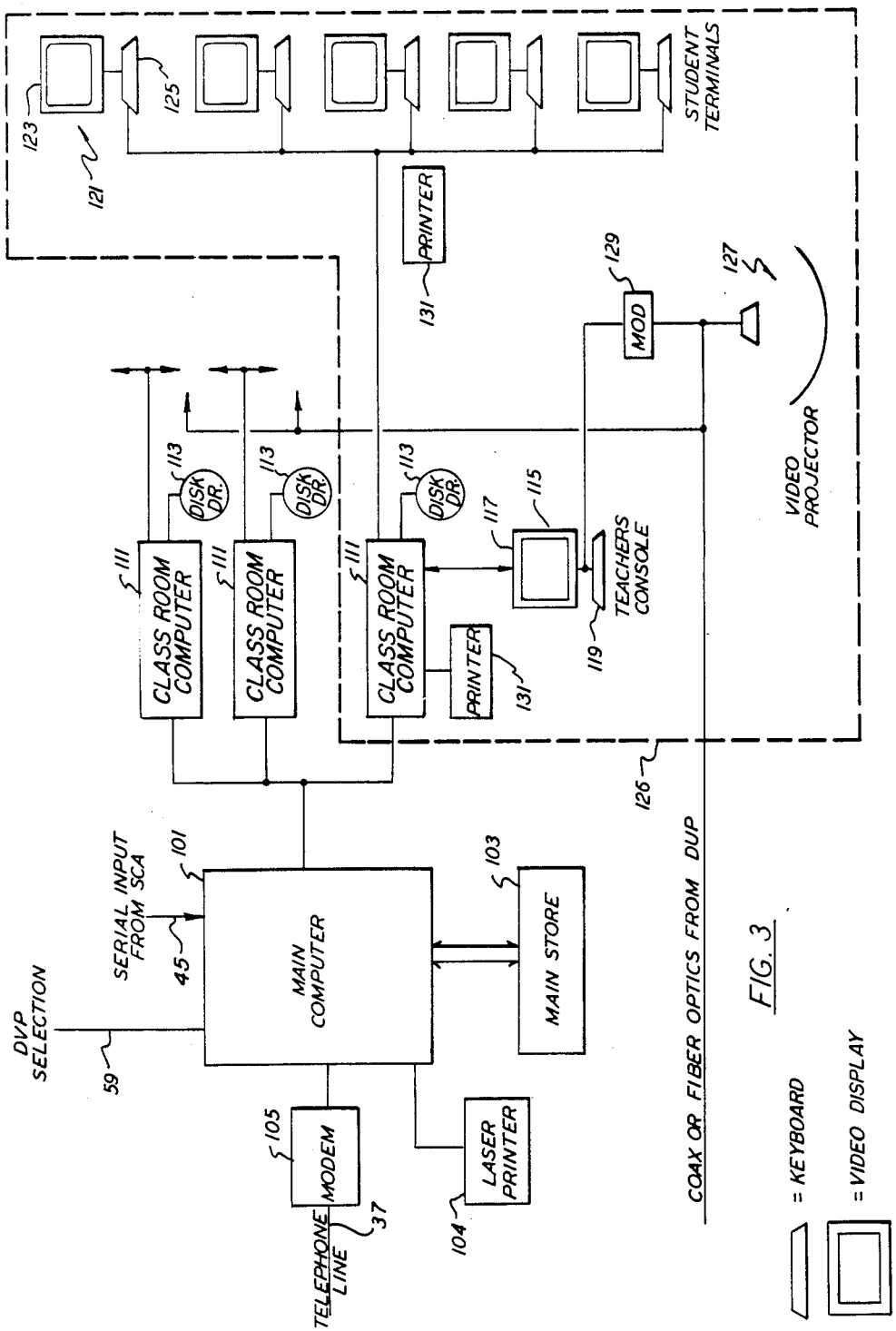

EDUCATION UTILITY

BACKGROUND OF THE INVENTION

This invention relates to information distribution in general and more particularly to a method of distributing educational material over a wide area, hereinafter referred to as the Education Utility.

Present methods of distributing educational material whether it be in the form of books, films, video tapes, computer programs or other types of material are relatively expensive and inefficient. Very often, material, particularly in the case of textbooks, for example, may be out of date before it reaches the classroom.

There has been a great deal of emphasis on the use of computers in the educational process in recent years. There are a number of aspects to the use of computers in education. One aspect is the use of computers to aid in the educational process through the use of educational software. A second use of computers is in the familiarization of students with the use of computers and utility-type computer programs, for example, the use of financial spread sheet programs, word processing, text editing, etc. which they may have to use later on in their careers in business. This is sometimes referred to as computer literacy. Finally, there is the training, which is given in some instances, in programming of computers to teach the students how to write and develop their own programs.

For the most part, computer use in schools has been through microcomputers. Each individual microcomputer requires, in addition to its own keyboard and display a storage device such as a tape or disc drive. If a computer is to be provided for each student in a classroom, this arrangement must be duplicated for each student. The disc drives, in particular add to the initial cost and to maintenance problems and costs. Furthermore, the use of these separate computers requires a great many duplicate copies of the programs which are to be used. This further increases the cost and in many cases leads to an unlawful copying of software also making it virtually impossible logistically to modify or update software or courseware once it is distributed. This removes some of the incentive for programmers to develop good software for use in computer-aided instruction.

This brings up another problem. It is presently very difficult for educators to evaluate the value of any given software package for use in computer-aided instruction. Very little data is available on the use and satisfaction of others.

Television has come into some use in the schools primarily through educational channels in which educational material is broadcast over the air to the various schools. Little has been done however to integrate this with other instructional material such as computer-aided instruction.

Thus, although technology has made available various tools which can aid in the educational process, these tools have not been efficiently used. The need to apply this available technology to the educational system, that is to say, the need for an educational utility which will distribute educational material to schools just as present public utilities distribute electricity, gas, water, telephone services and the like becomes evident. In such a system, the ability to provide up-to-date information should be available as well as the ability to account for the use of information so that the creators of the courseware be it in the form of film, video tape, software or whatever are properly compensated for their endeavors.

SUMMARY OF THE INVENTION

The present invention provides such an educational utility. It permits distribution of courseware to a large area, essentially the whole country, simultaneously, at low cost and high speed. Films, video tapes, computer programs, computer-aided instruction, textual information and the like can all be converted into a form which can then be transmitted over the air. Various courseware and filmware can be combined for much greater effectiveness and interaction e.g., video with text.

Transmission of the information is done using existing satellite, FM radio and television facilities. In the case of some of the facilities such as television this is preferably done during the night when these facilities are not otherwise being used.

Information, be it in the form of digital data or video information, e.g. a televised film, video tape lecture, etc. is transmitted from an up-link station to a satellite. The digital data is transmitted from the satellite to an FM radio station which transmits this data using SCA [Subsidiary Channel Authorization], a type of side band transmission authorized by the FCC. FM SCA transmission is only given as an example. Other forms of broadcast may be used for transmitting this data. Video information is either transmitted directly from the satellite to a dish antenna at the school or preferably through a local TV station to the individual schools. Along with each type of information being transmitted are address codes of a conventional nature. The structuring of the codes may vary according to circumstances. For example an address code can be used to indicate whether the school is an elementary school, middle school or high school and only the information relevant to that particular type of school will be enabled to be received. In addition, schools can subscribe to different types of services and the address codes established so that only the material to which they subscribe will be received. Both group codes and individual codes may be used. Data can be directed to a group of schools or individual schools; addressing to an individual student is a part of the education utility method.

A school which is addressed, will receive the digital data which will be loaded into mass storage in a central computer for the school. If video data is being supplied it can be stored on a video storage medium, e.g., in a delayed video program device, a device where it is available for future use. One type of device which may be used for this purpose has a capacity of up to 20 one hour cassettes. Of course other forms of storage such as disk storage may be used.

A typical school installation will include a main computer which has associated with it a main storage device, e.g., a large hard disc. On the hard disc, all of the digital information which the main computer has received will be stored. It will of course, take a period of time to build up a complete library of information on the main computer. Once the basic library is built up, daily updating will take place. Associated with the main computer will typically be a high speed printer, such as an ink jet or laser printer permitting making hard copies of the various textual material which is stored. Also associated with the main computer is a modem connected to a dial-up telephone line and remotely activated for transmitting usage information back to the main office automatically, preferably at night. The main computer also provides control inputs for the delayed video program cassette or other video memory device, if installed.

Coupled to the main computer are a plurality of classroom computers typically one for each classroom. Classroom computers are smaller computers and take, out of the full library of data and other software, the data which the particular teacher in that classroom wishes to use over a period of time. Each classroom is also optionally provided with a television display device connected by a coaxial cable or fiber optics to the video storage device. This may be a television set or preferably a video projector.

Each classroom computer supports a plurality of intelligent terminals or microcomputers at student desks. The students thus have access to the programs in the classroom computer. The student terminals may be specially constructed terminals or may comprise preexisting microcomputers, e.g., personal computers, equipped with an interface which permits accessing the classroom computer and its associated storage device rather than the disc drive which would normally be associated with the personal computer. The interface and software are made secure so as to prevent duplication of the software. The classroom computer is adapted to keep track of the number of students using a particular software package as well as their performance with the courseware at every juncture and provides this information back to the main computer. This usage and performance information along with the usage information with respect to the video storage device which is also kept in the main computer if video is also provided, is periodically transmitted through the modem and telephone line back to the main office for accounting purposes. This allows charges to be made for software rental, copyright royalties, as well as madk possible instant field testing, modifying or updating software and/or courseware.

The system of the present invention has numerous advantages. In terms of providing computing resources to the school, it provides these at low cost. In addition to the ability to receive computer-aided instruction programs, each of the student terminals is capable of accessing various utility programs to aid in computer familiarity and is able to be used to create a student's own programs. The school can create its own software to be stored in the main computer for which special charges will not be made.

In comparison to some distributed systems now in use which utilize telephone links, interactive processing can take place without incurring transmission costs.

Along with the provision of educational material, the system also provides the capability to provide electronic mail services, bulletin boards, computer conferencing and so on. Since any necessary communications between schools can be carried out in hours when charges are low, e.g., at night, the costs are kept low. Also whole batches of information are transmitted at one time, further keeping costs low. Thus, each school, in addition to getting educational material from the system can receive electronic mail from other schools or, for example, state education authorities. Announcements can be made by bulletin board and so forth. To send a message to another facility, one uses the telephone link during off-hours. In other words, outgoing messages are prepared during the day and stored in the main computer. At the assigned time, the telephone link is remotely and automatically established through the modem and all messages sent to the main computer center [or an intermediate computer center, or, the local FM station].

The system provides a secure form of software rental without the risk of piracy as now occurs when discs are used. It permits delivering and storing data bases in schools in a particularly efficient manner and the ability to keep all software in the school updated without manual intervention by the school.

The need for floppy discs and the problems associated therewith are avoided since all software is accessible from the main computer at all terminals. Since this software can be loaded into each individual terminal, it is possible for the software to be used individually at each terminal. Thus, if the nature of its use is such that the whole class goes along together that can be done. However, it is also possible for each student to work at his own pace on other types of computer-aided instruction or programs.

Because the system has an ability to also provide audio and visual information stored on a video storage device, along with providing the digital information to the computer, which information may in many cases simply be textual material or a series of questions, the material delivered to the computer can be integrated with video material thereby making the courseware provided at each individual terminal interactive with the televised films, video storage devices or telelectures provided to the whole class. Thus for example, with the addition of video, a presentation can be given on the screen and at the same time pertinent questions asked on the terminal which the student can answer during the presentation or after it is over using the student terminal. This type of interactive instruction can be particularly useful and goes beyond what the computer or television presentation alone can do.

The system in addition to keeping track of royalties so that the schools may be billed and the creators compensated based on use, also has the inherent ability to keep track of student and teacher performance and use. This information is particularly useful in evaluating the quality of the courseware.

The system also permits taking advantage of the latest current events, software, data bases, educational services and so forth essentially instantly. Presently, the distribution of new software over a wide area can be quite time-consuming. With the Education Utility, as soon as the software is ready, it can be transmitted throughout the country by satellite and be available the same day to every school. This ability is even more important in terms of current events, developments or changes which take place.

The system also provides the ability to create and/or provide administrative services and teacher curriculum and training material when and where needed. Once a school is wired for the present system, it is available to accept essentially any new video educational service or product without additional hardware.

The system of the present invention provides a complete internal and external telecommunications system for the school. The ability to provide electronic mail outside the school was noted above. However, the system can also provide electronic mail within the school with information being entered at the main computer and distributed to the classrooms and if desired to student terminals. If a large screen video display is provided, the teacher's console or students terminal can provide information such as bulletin board information or computer graphics etc., through a modulator to the large screen display in the classroom when it is desired to present information to the whole class. This is also useful to give a programming demonstration or the like.

The system also provides benefits to the community as a whole. After school hours, the facilities can be used for retraining, continuing education and adult education. In addition, if desired the system can be expanded to permit access by home computers via telephone or cable systems.

The system can also provide an on-site disposable book or educational publishing system. Through the system, text material can be transmitted, stored in the main store and then, after word processing or text editing, if necessary, printed out on a high speed printing device and duplicated as necessary. This will permit educators to construct their own books and papers by going into storage and retreiving all pertinent material. The gathering editing, with translating if necessary, and electronic delivery of current information will all be part of the Educational Utility services provided to subscribers. For example, the Educational Utility can have correspondents throughout the world reporting on scientific developments. These scientific developments will be reported over the Educational Utility and will become part of the data base. When teachers are about to teach on a particular subject they can retrieve from the appropriate data base the necessary material including the most up-to-date reports and include them in their text which will be distributed to the class. Appropriate royalty payments will be made to the creators of the material.

The system also permits delivery of software for preview and approval or comments. When a new type of software is developed, it can be sent out on approval to a few test schools and once the results are obtained immediately distributed widely if the results warrant. In addition, when new software is distributed it can be sent out cost-free for a short period to allow subscribers to preview it before they must start paying.

BRIEF DESCRIPTION OF THE DRAWINGS

FIG. 3 is a block diagram of the computer system and its distribution throughout the school.

DETAILED DESCRIPTION OF THE INVENTION

Figure 1:
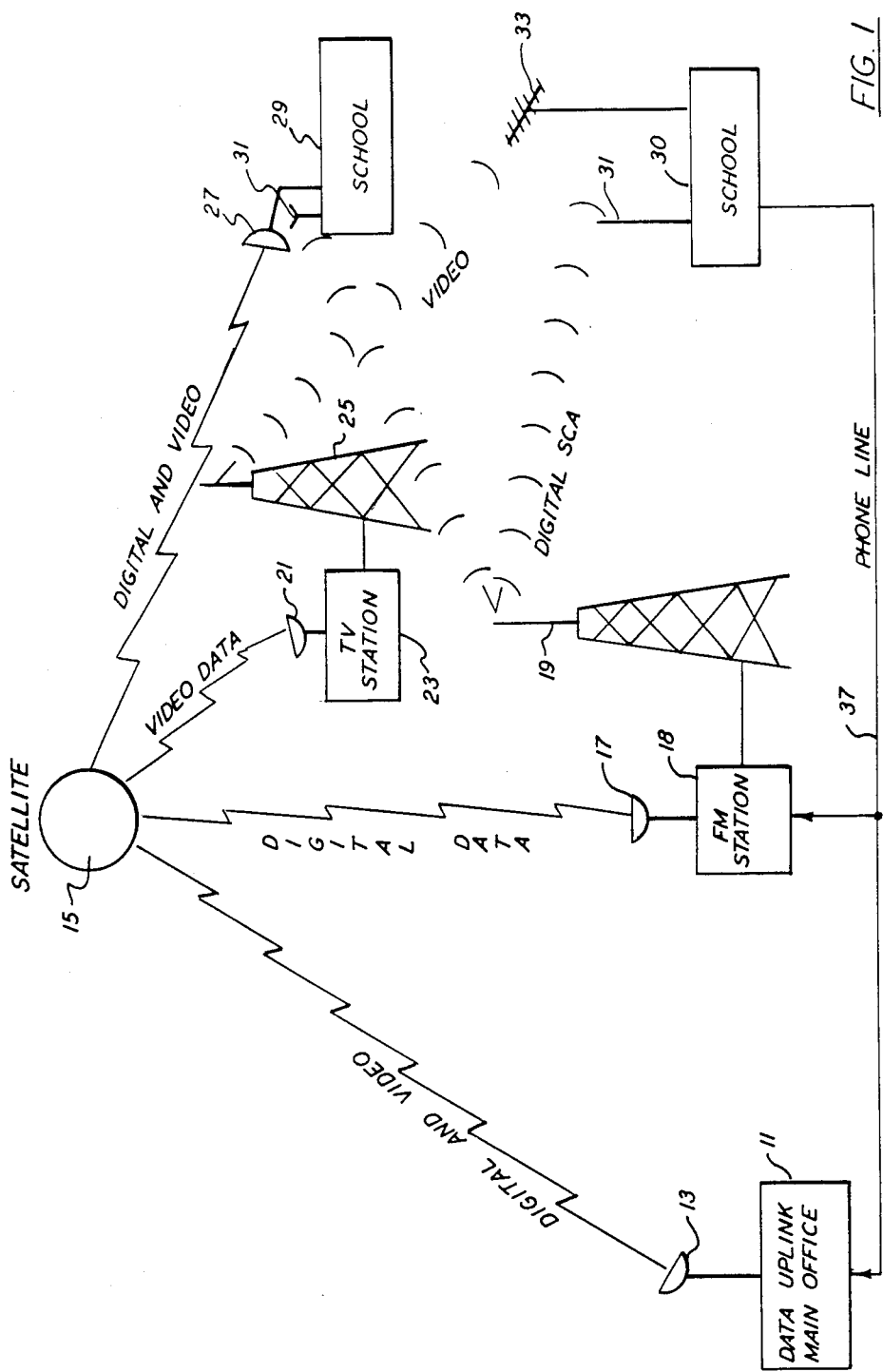
FIG. 1 is a block diagram showing the satellite, FM and TV distribution system.

FIG. 1 illustrates, in block diagram form, the general arrangement of the system of the present invention. At a main office 11, the information which is to be distributed over a wide area, which, for example, could include all of the United States, is formated and coded as necessary with address codes and transmitted via a transmitting antenna 13 to a satellite 15. In conventional fashion, the information is retransmitted from the satellite 15. The information sent to the satellite will include digital information and may also include television information, i.e., video and audio. The digital or computer information is transmitted by the satellite to a dish antenna 17 at an FM station 18 from which it is retransmitted from an antenna 19, on an FM SCA sideband. This method of transmission is described in detail in U.S. Pat. No. 4,417,349 and is also described in patent application No. 483,737, now abandoned and U.S. Pat. No. 4,558,454. These last two applications describe portions of a system capable of transmitting at a particularly high rate of 9600 baud. This is the preferred system for use with the present invention.

The video information, if used, may be transmitted to a dish antenna 21 at a TV station 23 from which it is retransmitted by transmitter 25. Alternatively, it can be transmitted directly to a dish antenna 27 at a school 29 which has, in addition to the antenna 27, an FM antenna 31. In the case of transmission from the television station 25, a school 31 has a TV antenna 33 and an FM antenna 31. Thus, with the additional use of television transmission, in either case, the school can obtain both audio and visual information, which can then be stored on a video storage device, at the same time as it obtains the digital computer information which is stored in computer memory for use in the future. As indicated previously, such transmissions typically take place during the dark hours when many stations are not in use.

Information concerning usage, electronic mail, etc. is sent back to the main office from the school 31 by a phone line 37. The information may be sent to the local FM station 18 in addition to or in place of sending information to the main office.

Figure 2:
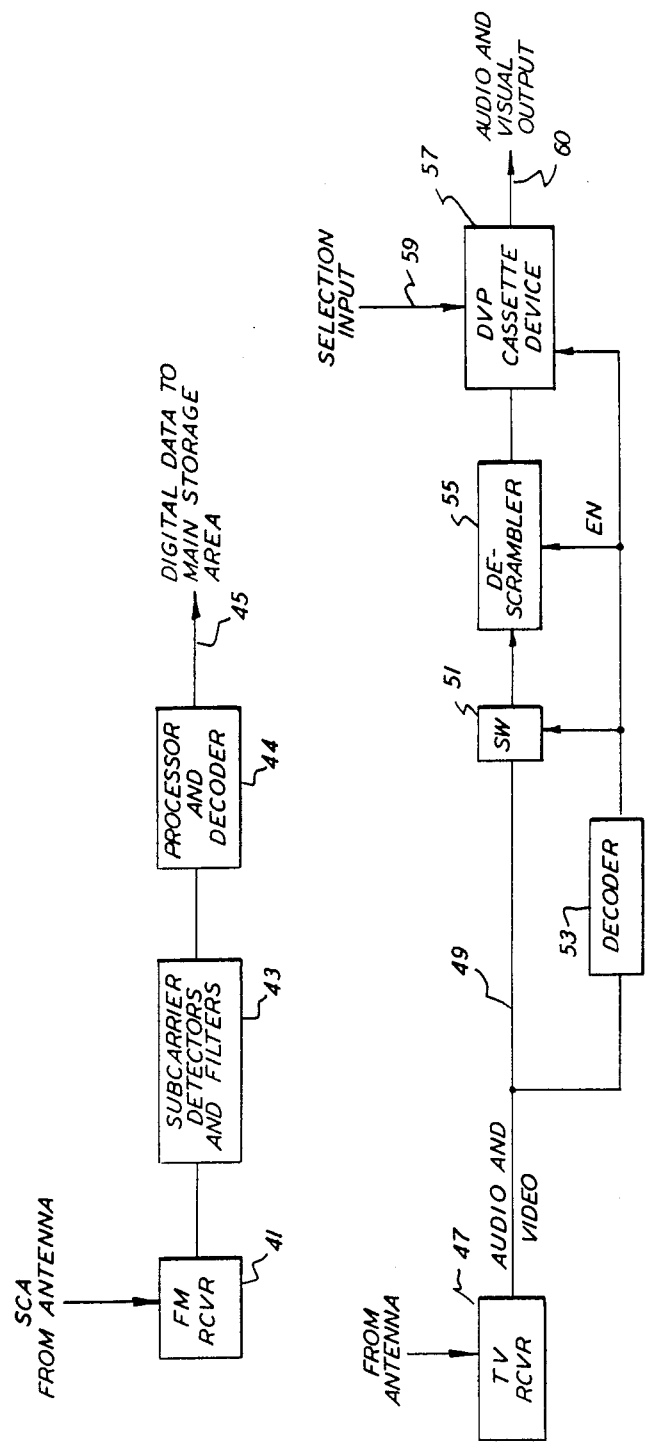
FIG. 2 is a block diagram showing the receivers and processing and decoding.

The SCA signal from the antenna is received in an FM receiver 41 as illustrated in FIG. 2. From the receiver, the signal is coupled through subcarrier detectors, filters 43 and a decoder and processor 44. This may be, for example, a microprocessor. If the information being received has an address corresponding to the address of the particular receiving station, the digital data appears on line 45 for transmission to a main storage area in a main computer.

If the system is also so adapted, video and audio information is received by a TV receiver 47 and the video and audio signal, after processing through the receiver, coupled over a line 49 to a switch 51 and to a decoder 53. Associated with each transmission is an address code which must be decoded in decoder 53 to close the switch 51. In addition, scrambling may be used and a de-scrambler 55 is provided, enabled by an output from decoder 53. Finally, the signal reaches a DVP or delayed video program cassette device 57. One such device has a capacity of up to 20 cassettes each of one-hour length. Devices using conventional two hour VHS cassettes, for example, may also be used. It is in effect a library which can store a number of programs and by means of a selection input 59 select one of them as an output on line 60.

The system can of course be expanded to provide selection of more than one cassette and more than one output. The signal from decoder 53 enables the cassette device to begin recording a video program which is being transmitted for storage. At the same time, information is transmitted over the SCA channel to identify and give a synopsis of the video program being transmitted. In addition, if there is any other courseware accompanying the video, that too could be transmitted at the same time, e.g. via FM SCA. The delayed video program device can also be set to cause one of the tapes to be erased so as to always have a tape ready to receive a transmission. Although the cassettes are typically one-hour cassettes, a series of shorter presentations can be stored on the tape with a preceding code, similar to the address code which allowed the material to be received in the first place. Through such a code, a portion of a particular video tape may be selected to be transmitted over the line 60 to classroom.

FIG. 3 shows the general arrangement of the various computers within the school. At a central location is a main computer 101 with an associated main store 103. This is a large capacity storage means, e.g., a hard disk, capable of storing the necessary courseware, programs data bases, etc. The main computer 101 receives serial input over the line 45 from the processor and decoder of FIG. 2. If the system is so equipped, it provides an output on line 59 to make a selection of the DVP cassettes in accordance with requests from various parts of the school. Optionally associated with the main computer is a high speed printer 104 e.g., an ink jet or laser printer which permits making hard copies of the courseware material. This in effect, permits the equivalent of textbooks or parts of textbooks to be transmitted, printed and duplicated in the school to allow the course material to be maintained in a current condition at all times. Furthermore, it permits teachers to tailor their course material, selecting from different sources stored in the computer.

Also associated with the main computer is an autodial modem 105 by means of which information concerning usage, electronic mail, etc. can be fed back over the telephone line 37.

The main computer 101 supplies a plurality of classroom computers 111. Whereas the main computer 101 is typically a main frame or mini-computer, its prime requirement is that it have a large memory. The classroom computers may be microcomputers with a relatively large memory such as hard disc drives 113 of a capacity of, e.g., 5 to 10M bytes. Bubble memory may be used instead of disk drives. Information is transferred from the main computer memory to the classroom computer memories either under the control of the main computer or in response to a request from a teacher entered at a teacher console 115. The teacher console 115 includes a video display 117 and keyboard 119 to communicate with the classroom computer.

The system is capable of distributing software from the main computer simulataneously to a plurality of the computers 111. Similarly, the computers 111 can distribute software to the various student terminals 121 each of which terminals include a video display 123 and keyboard 125 with its own processor and, e.g., 32 to 64K of memory. These terminals can be custom devices or may comprise pre-existing mini-computers or personal computers such as the Apple, IBM, Commodore, Atari, etc. Such computers normally access a floppy disc to obtain their program information. In accordance with the present invention, each is provided with the necessary interface adapter so that the disc operating system will access the classroom computer's storage rather than a dedicated floppy disc.

In addition, in each classroom, one classroom being indicated by the area within the dotted lines 125, there may be a video display 127, for example a video projector. If such is installed, the teacher's console, can be coupled to the video projector through a modulator 129, for example, so as to permit teachers to display to the whole classroom what they have on their unit. This can be useful in teaching programming or displaying bulletin board messages and the like. Each of the classroom computers is programmed to keep track of usage by the student terminals of the various programs and to feed this information back to the main computer which keeps a record of overall usage within the school for charging and royalty purposes.

As described above, the main computer receives information from the FM SCA data transmission. However, other means of information input can also be used such as high-speed data extracted from an incoming television signal, local disc, optical data disc and so on. More than likely when building up the initial data base, a physical delivery of discs to the individual schools will prove more efficient than transmitting all information over the air.

As also noted above, the main computer and, for that matter classroom computers can utilize other software not provided by the Education Utility. Furthermore, the main computer, classroom computers and terminals can comprise pre-existing equipment so that if a school has already invested in equipment it is not made obsolete by the Education Utility but only provided with an extended capability as far as sources of information are concerned.

As indicated, it is believed that a classroom computer with a storage capacity of, for example, 5 to 10 megabytes, expandable as necessary, is sufficient. The manner in which it is used in the present system is what is often referred to as a local area network file server. The teacher's console associated with this computer is in fact a privileged terminal which is the only one which allows ordering software and data files. Preferably teachers will also have access to the main computer over phone lines at home so that they may prepare for the next day.

The student terminals and the classroom computer need not have an associated printer. However, a low cost printer 131, may optionally be provided with the classroom computer and/or with individual terminals. Preferably, the connection between the classroom computer and the student terminals is by means of a star twisted-pair network with separate pairs for input and output. Each student terminal is provided with a "boot" program to permit the terminal to automatically log into the classroom computer and to load the chosen operating system into the terminal. The system is designed such that any of the standard personal computer operating systems such as Apple, DOS and IBM MS/DOS can be used. In each case the operating system is modified so that, whenever a disc access is called for, the terminal will instead access the classroom computer. The operating system used in each case is one which will not permit connection of a data drive and copying of any programs.

We claim:

1. A method of distributing educational information in digital form to a plurality of schools comprising:
   (a) transmitting the information from a central location;
   (b) simultaneously receiving said information at a plurality of schools and storing said information;
   (c) subsequently providing simultaneous access to said information by a plurality of students; and
   (d) keeping track of usage of said information and reporting back to the sender the level of usage to permit charging usage and royalty fees.

2. The method according to claim 1 wherein said information comprises computer software and computer-aided instructional material.

3. The method according to claim 1 comprising:
   (a) transmitting said material to a satellite;

(b) transmitting the material from said satellite to a plurality of FM stations; and (c) retransmitting the information from said FM stations on an Subsidiary Channel Authorization (SCA) band to schools.

4. The method according to claim 3 and further including:

(a) assigning to each school an address;

(b) including address information with each group of material transmitted; and decoding said address information at each individual school so that only schools to which said information is directed will receive access to said information.

5. The method according to claim 4 comprising using both group and individual addresses.

6. The method according to claim 1 wherein said step of providing access by a plurality of students includes:

(a) storing said information in a main computer storage device in each school;

(b) transferring information from said main computer storage device to a classroom computer storage device; and (c) transferring the information from the classroom computer storage device to each of a plurality of individual student terminals.

7. The method according to claim 1 and further including:

(a) transmitting audio and video information;

(b) receiving said audio and video information at a television receiver at each school; and (c) storing said audio and video information on a video storage medium and providing access to said video storage medium by individual classrooms.

8. The method according to claim 7 comprising transmitting both audio and video information and digital information related to said audio and video information so as to permit interactive viewing of said audio and video information by students.

9. The method according to claim 8 wherein said transmission of audio and video information includes:

(a) transmitting said audio and video information to a satellite;

(b) retransmitting the audio and video information from said satellite;

(c) simultaneously receiving said audio and video information at a plurality of television stations; and (d) retransmitting said audio and video information to the television receivers at each of said plurality of schools.

10. The method according to claim 1 and further including printing selected portions of the information stored at said schools to provide textual material.

11. The method according to claim 1 comprising continually and periodically updating material.

12. A system for distributing educational information in digital form to a plurality of schools comprising:

(a) means for transmitting said information from a central location;

(b) means for simultaneously receiving said information at a plurality of schools and means for storing said information;

(c) means for subsequently providing simultaneous access to said information by a plurality of student terminals; and (d) means for keeping track of usage of said information and reporting back to the sender the level of usage to permit charging usage and royalty fees.

13. A system according to claim 12 wherein said information comprises computer software and computer-aided instructional material.

14. A system according to claim 12 wherein said means for transmitting includes:

(a) a satellite to which information is sent for retransmission, (b) a plurality of FM stations receiving signals from said satellite and retransmitting the information on an Subsidiary Channel Authorization (SCA) band to said schools.

15. A system according to claim 12 and wherein said digital information includes address information and means for decoding said address information at each individual school so that only schools to which said information is directed will receive access to said information.

16. A system according to claim 12 wherein said means for storing comprises a main computer and main computer storage device and said means for providing access by a plurality of students includes:

(a) a classroom computer, storage device and teachers console receiving information from said main computer; and (b) a plurality of individual student terminals, simultaneously receiving information from said classroom computer storage device.

17. A system according to claim 16 wherein each terminal has its own address whereby electronic mail may be sent to an individual student.

18. A system according to claim 12 and further including:

(a) means for transmitting audio and video information;

(b) means for receiving said audio and video information at a television receiver at each school; and (c) means for automatically storing said audio and video information on a video storage medium and for providing access to said video storage medium by individual classrooms without manual intervention.

19. A system according to claim 18 and further including:

means for advising the central location the number of times the video information is played for royalties purposes.

20. A system according to claim 18 wherein said means for transmitting audio and video information includes:

(a) means for transmitting said audio and video information to a satellite;

(b) means for retransmitting the audio and video information from said satellite;

(c) means for simultaneously receiving said audio and video information at a plurality of television stations; and (d) means for retransmitting said audio and video information to the television receivers at each of said plurality of schools.

21. A system according to claim 12 and further including means for printing selected portions of the information stored at said main computer.

22. A method of distributing educational information in digital form to a plurality of schools comprising:

(a) transmitting the information from a central location;

(b) simultaneously receiving said information at a plurality of schools and storing said information at a central storage area in each school; and (c) subsequently providing simultaneous access to said stored information at a plurality of individual student terminals.

23. The method according to claim 22 and further including keeping track of usage of said information and reporting back to the sender the level of usage to permit charging usage and royalty fees.

24. The method according to claim 22 wherein said information comprises computer software and computer-aided instructional material.

25. The method according to claim 22 wherein said step of providing access at a plurality of individual student terminals includes:

(a) storing said information in a main computer storage device in each school;

(b) transferring information from said main computer storage device to a classroom computer storage device; and (c) transferring the information from the classroom computer storage device to each of a plurality of individual student terminals.

26. A method of distributing information in digital form to a plurality of sites comprising:

(a) transmitting the information from a central location;

(b) simultaneously receiving said information at a plurality of sites and storing said information in a storage area at each site; and (c) subsequently providing simultaneous access to said stored information upon request by one or more user terminals.

27. The method according to claim 26 and further including keeping track of usage of said information and reporting back to the sender the level of usage to permit charging usage and royalty fees.

28. The method according to claim 26 wherein said information comprises computer software.

29. The method according to claim 26 wherein said step of providing access by a plurality of individual user terminals includes:

(a) storing said information in a main computer storage device at each site;

(b) transferring information from said main computer storage device to a further computer storage device; and (c) transferring the information from the further computer storage device to each of a plurality of individual user terminals.

30. A method of distributing information in digital form to a plurality of remote sites comprising:

(a) transmitting the information from a central location;

(b) simultaneously receiving said information at a plurality of sites and storing said information;

(c) subsequently accessing said information at said site;

(d) keeping track of usage of said information and reporting back to the sender the level of usage to permit charging usage and royalty fees.

31. The method according to claim 30 wherein said information comprises computer software.

32. A system for distributing information in digital form to a plurality of sites comprising:

(a) means for transmitting said information from a central location;

(b) means for simultaneously receiving said information at a plurality of sites and means for storing said information;

(c) means for requesting access to said information; and (d) means for responding to said means for requesting access by subsequently providing simultaneous access to said information at a plurality of terminals.

33. A system according to claim 32 wherein said information is educational information and said terminals are individual student terminals.

34. A system according to claim 33 and further including means for keeping track of usage of said information and reporting back to the sender the level of usage to permit charging usage and royalty fees.

35. A system according to claim 32 and further including means for keeping track of usage of said information and reporting back to the sender the level of usage to permit charging usage and royalty fees.

36. A system according to claim 32 wherein said information comprises computer software.

37. A system according to claim 33 wherein said means for storing comprises a main computer and main computer storage device and said means for providing access at a plurality of student terminals including:

(a) a classroom computer, storage device and teachers console receiving information from said main computer; and (b) a plurality of individual student terminals, simultaneously receiving information from said classroom computer storage device.

38. A system for distributing information in digital form to a plurality of sites comprising:

(a) means for transmitting said information from a central location;

(b) means for simultaneously receiving said information at a plurality of sites and means for storing said information;

(c) means for subsequently providing simultaneous access to said stored information at a plurality of terminals; and (d) means for keeping track of usage of said information and reporting back to the sender the level of usage to permit charging usage and royalty fees.

39. A system according to claim 38 wherein said information comprises computer software and computer-aided instructional material.

* * * * *